(12) United States Patent
Kalra et al.

(10) Patent No.: US 11,080,737 B1
(45) Date of Patent: Aug. 3, 2021

(54) SYSTEM AND METHOD FOR GENERATING AN AFFILIATE LINK FROM A SELECTED ITEM ON A COMPUTING DEVICE

(71) Applicants: Rajat Kalra, Pickering (CA); Chung Ming Tse, Markham (CA)

(72) Inventors: Rajat Kalra, Pickering (CA); Chung Ming Tse, Markham (CA)

( * ) Notice: Subject to any disclaimer, the term of this patent is extended or adjusted under 35 U.S.C. 154(b) by 189 days.

(21) Appl. No.: 15/891,690

(22) Filed: Feb. 8, 2018

Related U.S. Application Data (60) Provisional application No. 62/456,900, filed on Feb. 9, 2017.

(51) Int. Cl.
*G06Q 30/02* (2012.01)
*G06Q 30/06* (2012.01)
*G06F 16/955* (2019.01)

(52) U.S. Cl.
CPC ..... *G06Q 30/0214* (2013.01); *G06F 16/9566* (2019.01); *G06Q 30/0641* (2013.01)

(58) Field of Classification Search
CPC ................. G06Q 30/0214; G06Q 30/0641
USPC ...................................................... 705/14.16
See application file for complete search history.

(56) References Cited

U.S. PATENT DOCUMENTS

| 2013/0282455 A1* | 10/2013 | Houseworth | ...... G06Q 30/0214 |
| | | | 705/14.16 |
| 2016/0034936 A1* | 2/2016 | Bryant, III | ............. G06Q 50/01 |
| | | | 705/14.16 |

* cited by examiner

*Primary Examiner* — Azam A Ansari
(74) *Attorney, Agent, or Firm* — Ridout & Maybee LLP (57) ABSTRACT

The invention provides a system and method for generating affiliate links that may be shared between users of computing devices. A method of the invention may include the steps of receiving from a server system a user identifier of a client system (e.g. smartphone with client application) and persistently storing the client identifier at the client system. Information identifying an item such as a product or retailer may be displayed as well as an indication of a single action to be performed (e.g. "share" button) to generate an affiliate link from the product information. In response to the indicated single action being performed, the client system automatically sends relevant item information and user information to the server system which creates an affiliate link by referring to a database of affiliate information. The generated affiliate link is communicated to the client system which may communicate the affiliate link to other computing users directly via SMS or via other computing applications such as email or a social network. The user initiated the sharing action may earn revenue when other users purchase an item by interacting with the shared affiliate link.

18 Claims, 12 Drawing Sheets

SYSTEM AND METHOD FOR GENERATING AN AFFILIATE LINK FROM A SELECTED ITEM ON A COMPUTING DEVICE

FIELD OF THE INVENTION

The invention relates to computer implemented methods and systems related to e-commerce, and more particularly, to generating affiliate links from a retailers website information so that a user sharing the generated affiliate link may earn money when other users interact with the shared affiliate link and make a purchase.

BACKGROUND

Becoming a member in one or more retailers affiliate programs is a common way for users with a websites and/or application to generate revenue.

Typically, a website user will manually subscribe to the retailers affiliate programs that are of interest to them and then add specific codes within their website which allows affiliate content and links to be published to the website by the affiliate program software. When a visitor to the website clicks on a particular affiliate link and buys an associated product or service from the retailer, the website user will typically earn a commission of the purchase.

Each retailer with an existing affiliate program (e.g. Amazon, Walmart, Macy's) typically has a plethora of rules related to how the affiliate links are used and displayed that a member must follow in order to remain a member in good standing of their affiliate program, and hence, to continue to receive the links and have an opportunity to generate revenue.

A website user may wish to subscribe to multiple retailer affiliate programs in order to provide the most relevant and interesting content to visitors, however, this is cumbersome for several reasons. First, the codes provided by the affiliate programs are typically hard-coded into various parts of a website which means that only one affiliate program can be used in a particular portion of a website. Secondly, keeping track of the various rules for each retailers affiliate program can be difficult and the rules will often conflict.

Given the difficulties in deploying affiliate content from more than one affiliate provider, a website user will generally confine themselves to only one affiliate program on a given webpage.

Furthermore, affiliate programs are generally offered to website users and application providers and not to everyday people who do not have their own websites or applications. These types of users may wish to participate in affiliate program manually with friends or colleagues by copying a url of a product and sending it to the desired persons. In these situations, these users won't receive a percentage of the transaction, even if when one or or more of the receiving users buys an item from the product link because the affiliate program information and user identification is not contained in the product link that is shared.

SUMMARY

Disclosed herein is an affiliate sharing system that overcomes or mitigates at least one of the disadvantages of the prior art.

In one aspect, the invention makes it easier for everyday individuals to use our invention by allowing them to generate an affiliate link from an item selected on a computing device, such as desktop or mobile phone with internet connection.

The method may include providing at least one item from a retailers website to a user of a computing device and the individual selecting an item from a user interface screen. An item details screen may be provided which includes a single-action user interface element (such as a "Share" button which may have other text or a logo). Upon selecting the single-action user interface element, a request may be communicated to a server system to generate an affiliate link. Additional information may be communicated to the server system with the request such as information about the individual sending the request and relevant item information. The server system may access a database of affiliate program information to determine a match between the product information and a particular affiliate program. An affiliate link is generated by the server system based on the match and this affiliate link is communicated to the client device where the single action was performed.

The ease of our proposed system is such that the individual selecting the single-action user interface element does not need to provide any information about the product or their credentials at the time of sharing the affiliate link since the user credentials may be cached in the client's system.

In another aspect, the method may include sharing the generated affiliate link from the computing device of the user selecting the single-action element to users of other computing devices such that the sharing user may earn a commission if a user makes a purchase by interacting with the shared affiliate link.

In some aspects, in generating the affiliate link, the server system includes information for tracking purchases made by users that interact with the shared link so the sharing user earns a commission upon purchase.

In one aspect, the invention provides a system for generating affiliate links from item information so the generated affiliate links may be shared to users of computer applications such as Facebook, WhatsApp, Snapchat, and the like.

In various aspects, the invention provides a computer-implemented method for generating an affiliate link from an item selected on a computing device. The method includes displaying one or more items for selection on a user interface screen and allowing the selection of the one or more items. The items may be products or general content from the retailers website such as their homepage.

When a user selects a particular item an item page is displayed on the user interface screen which includes a single-action user interface screen for generating an affiliate link which may be shared with users of other computing devices. Upon selecting the single-action user interface element, a request is sent to a server system to generate an affiliate link from the item information and communicating the relevant item information and user information to the server system. The server system accesses a database of affiliate program information and user information. The server system creates a match between the item details and an applicable affiliate program and communicates the generated affiliate link back to the users device where the single action was performed. The user does not need to provide any information for the affiliate link to be generated but only needs to perform the single action on the user interface screen.

In some aspects, the generated affiliate link may be shared by the user performing the single action so that the user earns a commission when other users make a purchase by interacting with the shared affiliate link that was generated by the server system.

In various aspect, the generated affiliate link may be masked (i.e. shortened) by a branded URL which corresponds to the generated affiliate link so that a user receiving the shared link is directed to the server system upon selecting the masked URL which redirects the user to the affiliate URL page.

DESCRIPTION

Figure 1:
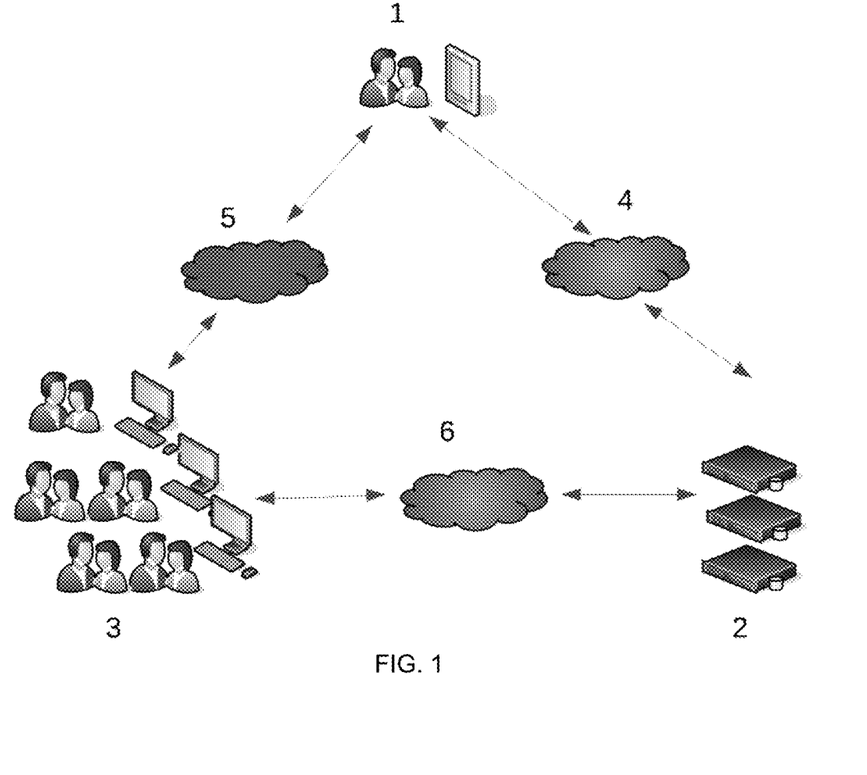
FIG. 1 shows a system diagram that illustrates some components of an affiliate publishing system according to an embodiment of the invention.
Figure 6:
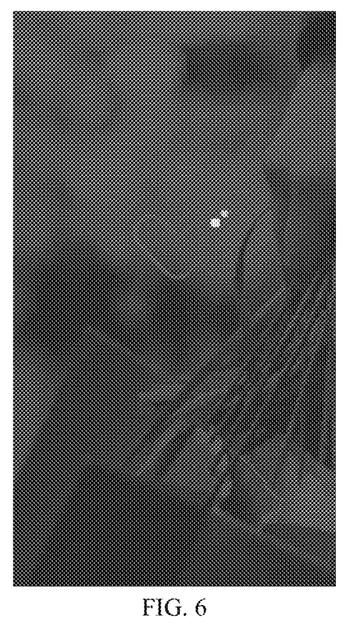
FIGS. 6-26 show exemplary user interface screens for the creation of affiliate links from merchant information, a software dashboard for managing a user's preferences and settings, and payout screens that illustrate the preference and earnings that have resulted from sharing the generated affiliate links to other users.
Figure 7:
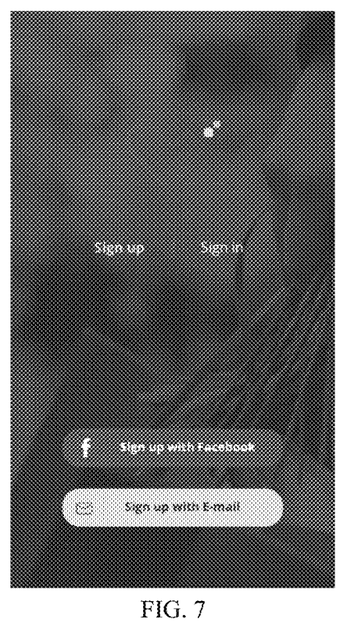
Figure 8:
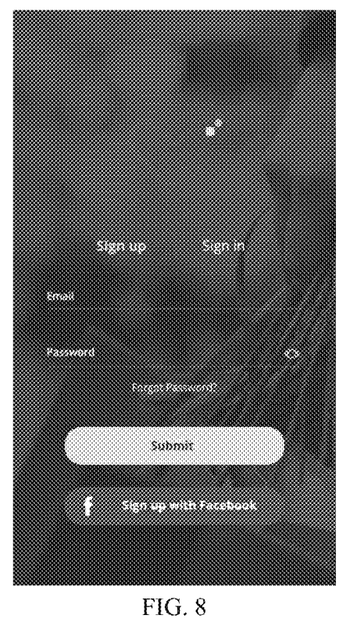
Figure 9:
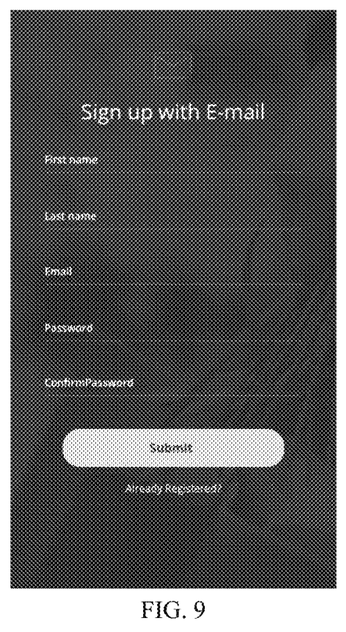
Figure 10:
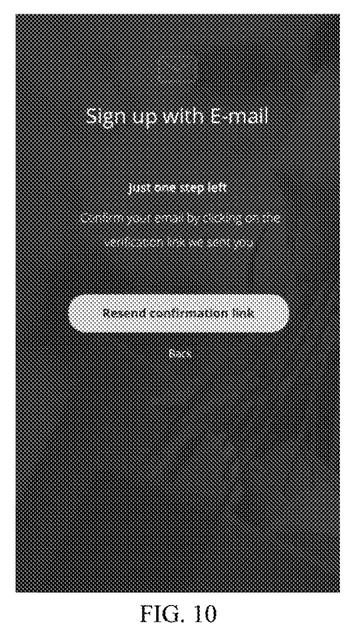
Figure 11:
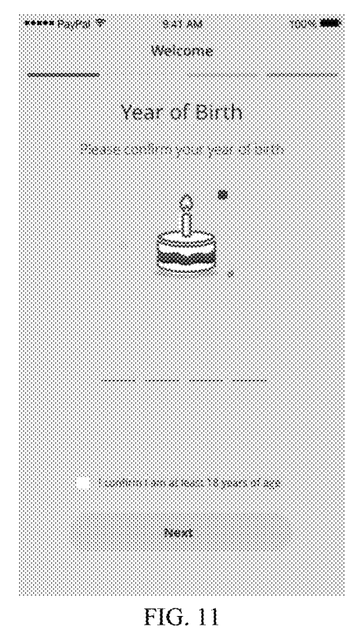
Figure 12:
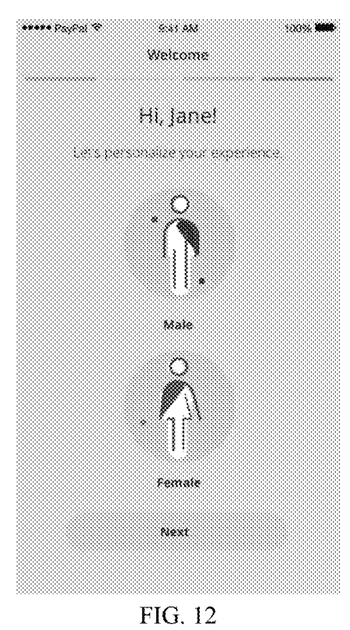
Figure 13:
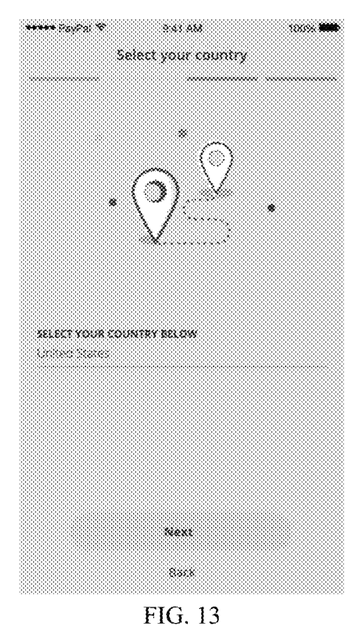
Figure 14:
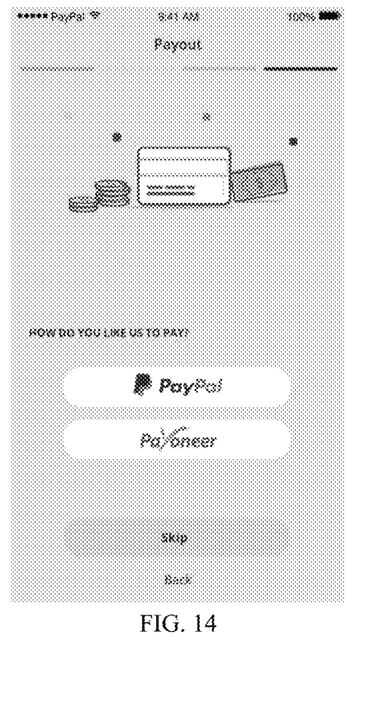
Figure 15:
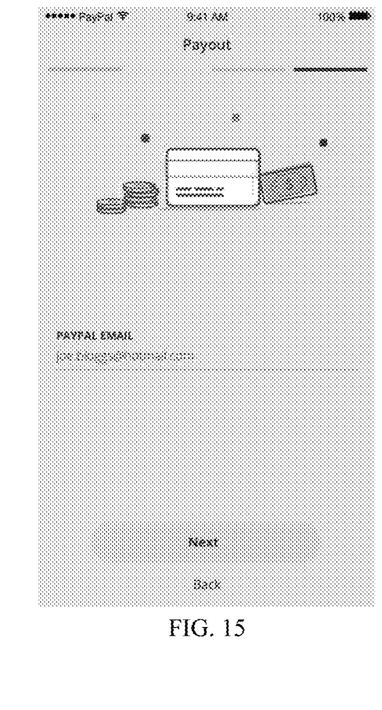

Reference is first made to FIG. 1 to describe embodiments of the systems and methods of the invention for generating affiliate links that may be shared between users of computing devices. An exemplary computing device containing hardware and software components is shown in FIG. 6 as an example of a computing device which may implement methods of the invention or be components of or interact with component of systems of the invention. A person skilled in the art will readily recognize that computer devices that may from part of the invention may take a variety of forms such that personal computers, servers, smartphones, tablets and the like may also work with the invention and implement its methods.

As shown in FIG. 1, a client system 1 may communicate with server system 2 across network 4. Networks 4, 5, 6 may represent any computing network capable of facilitating communication between computing devices and may include WiFi, Cellular, ethernet, satellite, etc. networks.

Typically, a client system 1 makes a request to server system 2 to create an affiliate link from product information that the user of client system 1 is viewing on the client application. The client application may be a single application for viewing products (i.e. a web browser showing an e-commerce site) and sharing affiliate links or may include multiple applications, one of which displays product information, and a second of which implements the affiliate link generation functions of the invention.

In some embodiments, client system 1 includes an application for displaying product information which can be viewed by a user, the application including a single action user interface element which is tied to a separate application (process) which coordinates communication between the client system and a server system so that an affiliate link may be generated from selected item information.

Figure 2:
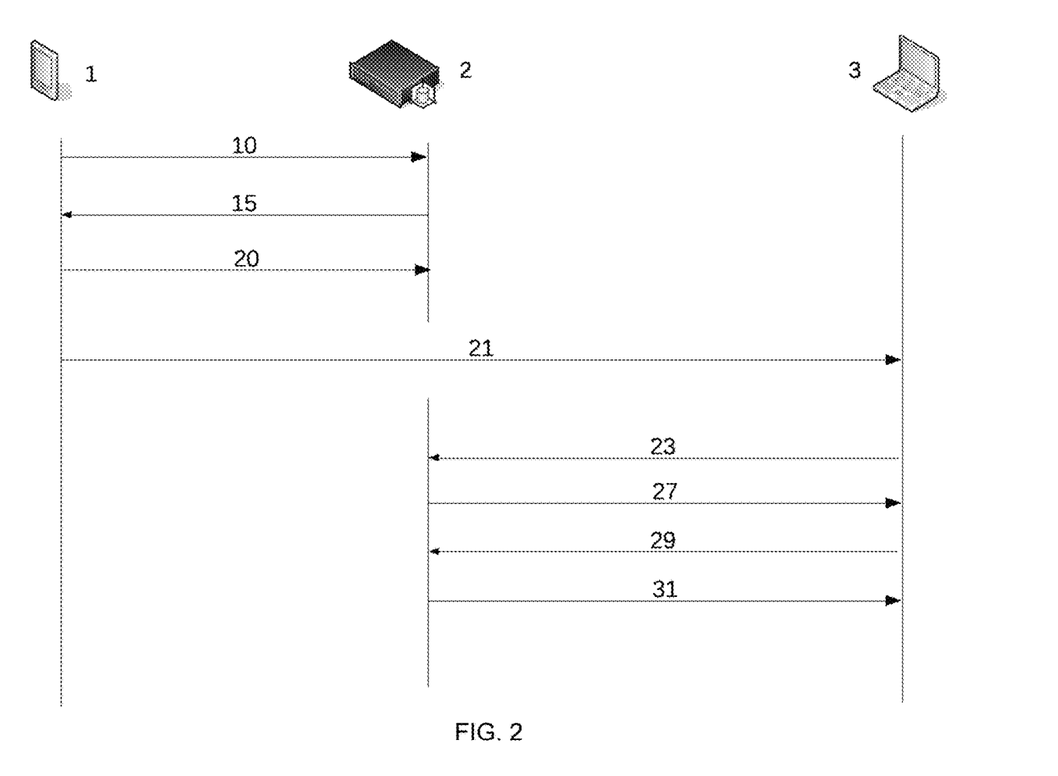
FIG. 2 shows a communications diagram that illustrates the communications relationships of various components of an affiliate publishing system according to an embodiment of the invention.

Referring to FIG. 2, a communications flow is shown which illustrates how the various components of systems of the invention communication with each other in order to generate and share affiliate links. A first client system 1 may communicate with a server system 2 to request that an affiliate link be created from a product link (i.e. product information). The server system typically creates an affiliate link from this request and sends the affiliate link to the requesting device. In some embodiments the server system may automatically share the generated link to other users of computing devices according to a selected (or determined) application. In other embodiments the client device shares the generated link with other users.

In either case, the generated link may be shared by accessing an application programming interface provided by the application that has been selected (or determined) to receive the shared link. In some embodiments the server or client system may share the generated affiliate link to multiple applications that have been selected (or determined) to receive the generated link.

Figure 3:
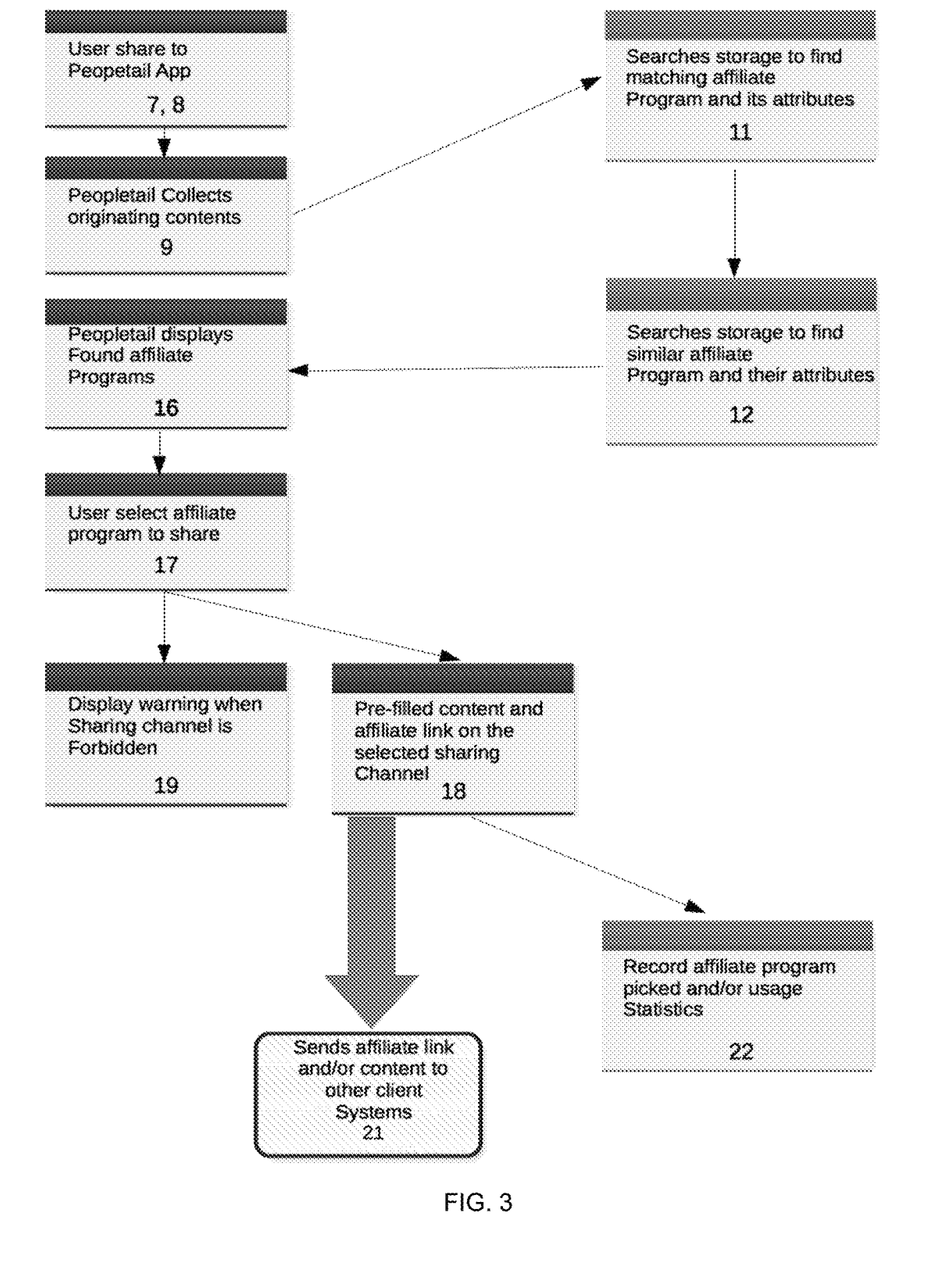
FIG. 3 shows a flow-diagram that illustrates steps of a method of publishing affiliate information according to an embodiment of the invention.
Figure 4:
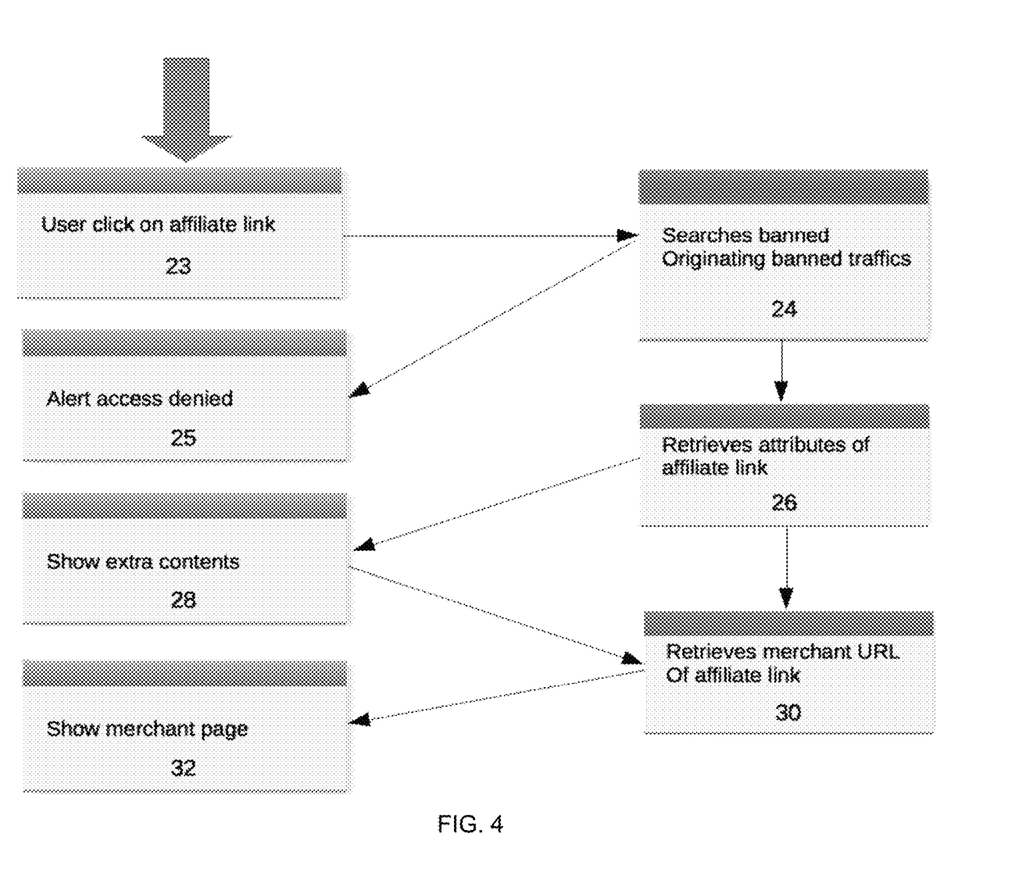
FIG. 4 shows the continuation of the flow-diagram of FIG. 3 that illustrates steps of a method for publishing affiliate information according to an embodiment of the invention.
Figure 5:
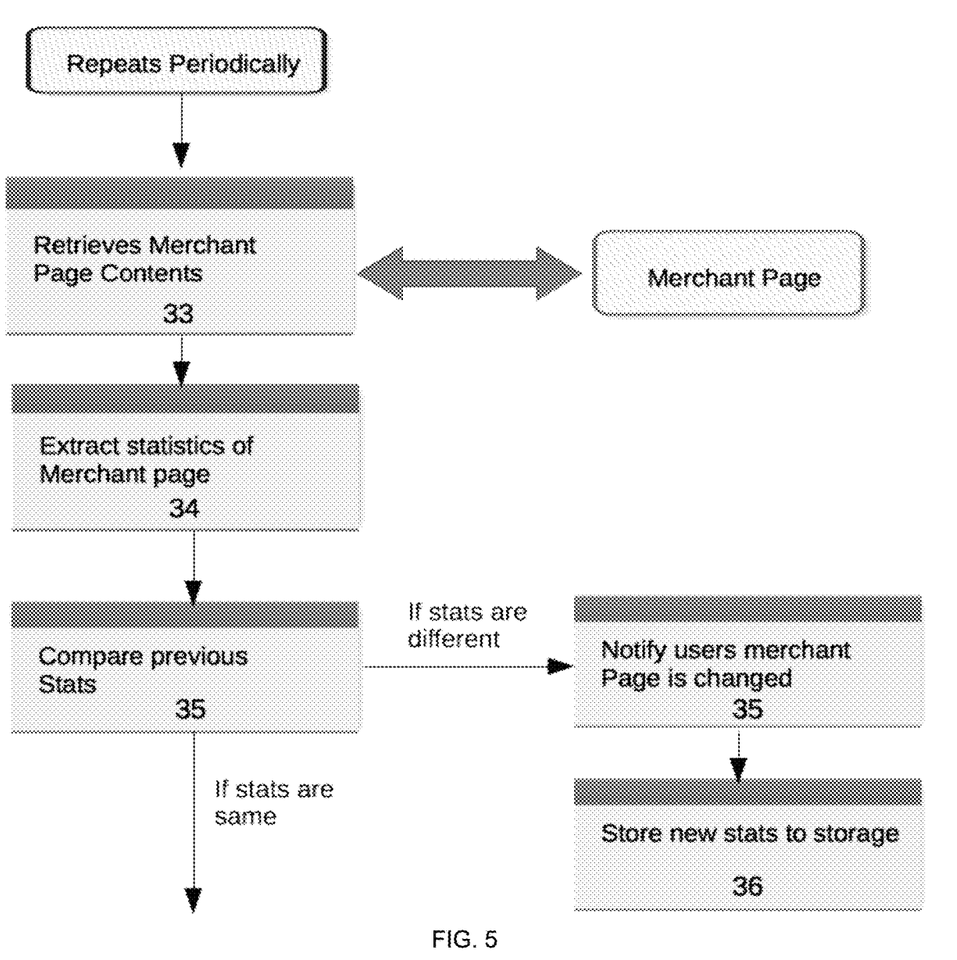
FIG. 5 shows the continuation flow-diagrams of FIGS. 3 and 4 and illustrates various steps of a method for publishing affiliate information according to an embodiment of the invention.

Referring to FIGS. 3-5, exemplary computer-implemented method steps are illustrated for generating affiliate links from item information such as a product or retailer.

FIG. 3 shows method steps for generating an affiliate link from product information. A user of an application (i.e. Mobile App) may interact with a single-action Ux element to share the affiliate link. Mobile App collects originating contents such as item information and user information. Mobile App may determine matching affiliate programs to the user who may select one or more affiliate programs to share. Mobile App then creates a an affiliate link which is shared with the receiving computing application. In some embodiments, Mobile App may display a warning that the sharing channel is not allowed to receive generated affiliate links.

FIG. 4 illustrates exemplary method steps in which a user may interact with shared affiliate links. When a user clicks (selects) the link the invention may determine whether the sharing user or receiving application is banned from being directed to an affiliate program which will send an alert to the user clicking the link. In other cases the user selecting the link may be directed to the merchant page where a purchase transaction can be made. The sharing user will generally receive a commission when the receiving user makes a purchase form the generated affiliate link.

FIG. 5 shows exemplary method steps for tracking changes in affiliate programs and notifying users thereof. In some embodiments a process repeats regularly in which merchant page contents are retrieved. Statistics of a particular merchant page may be extracted and compared to previous statistics. A user of the invention may be notified when a merchant page is changed and the new statistics may be stored in a server database.

The following exemplary embodiments are within the scope of the claimed invention; however, the scope of the invention includes additional embodiments as described throughout this patent application that are not described below.

Single Client System

In some embodiments of the invention, the client system includes functionality to display item information and communicate requests to generate affiliate links to the server system. A user interacts with a single client system which includes a single-action user interface element for sending the request to generate the affiliate link to the server system.

Client System Implementing an Application for Implementing Single-Action Ux Element Supported by a Separate Application for Managing Affiliate Link Generation In some embodiments, systems and methods of the invention include two client systems for sending a request to generate an affiliate link to the server system. In such an implementation, one client system may be used to view product information and another client system may communicate a request to generate an affiliate link to the server system. For example, a first client system may be an e-commerce or product site that allows users to browse for products that are of interest to them. A second client system may interact with the first client system by way of a system-wide share button that a user can select. Upon selecting the single-action share button (or other Ux element), the second client system sends relevant item and information and user information to the server system with a request to generate the affiliate link from the communicated information. The server system generates the link by referencing the database of user and affiliate program information and may return the generated link to the first and/or second client system for sharing with users of other computing devices.

Dashboard for Joining Affiliate Programs

In some embodiments, the invention includes displaying a software-implemented dashboard that allows users wishing to share generated links various options for participating in affiliate programs, setting payment preferences, setting sharing preferences and so forth. For example, one particular dashboard screen may allow a user of a client device to enroll in an affiliate program by selecting the affiliate program from a list of affiliate programs. The client device may communicate such a request to the server system which interacts with the affiliate program directly (or a third-party affiliate program manager such as Linkshare) to enroll the user. Other dashboard screens may allow a user to view the commissions earned by sharing affiliate links broken down by commissions already paid and commissions earned but not yet credited. A user may also set payment preferences using the dashboard by selecting preferred payment gateways such as Paypal.

Referring to FIGS. 6-29, exemplary user interface screens are shown which demonstrate exemplary functionality of the invention according to several embodiments.

FIG. 6 shows is a Ux (user interface) splash screen that may welcome users when they launch a computing application.

FIGS. 7-10 shows user interface screens for allowing a user to sign-up to a mobile application which facilitates the creation of affiliate links from product information and user information.

FIGS. 11-15 show user interface screens for allowing a user who is enrolling with an affiliate generating computing application to set user characteristics and preferences such as sexuality, geographic location (e.g. country) and payment preferences.

Figure 16:
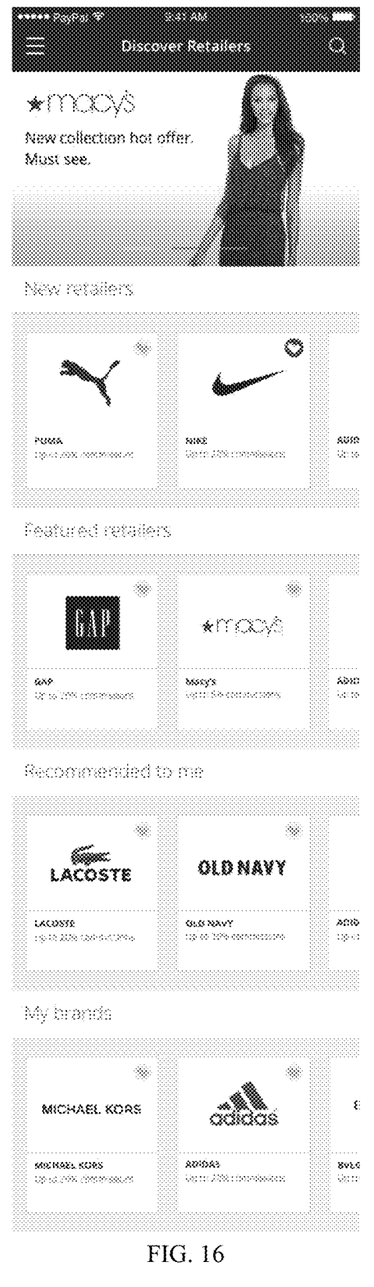

FIG. 16 shows an affiliate program enlistment screen in which a registered user may select and enroll in affiliate program which interest the user. The user can then share generated affiliate links with other users of computing devices by selecting items (or retailers) from affiliate listing screens.

Figure 17:
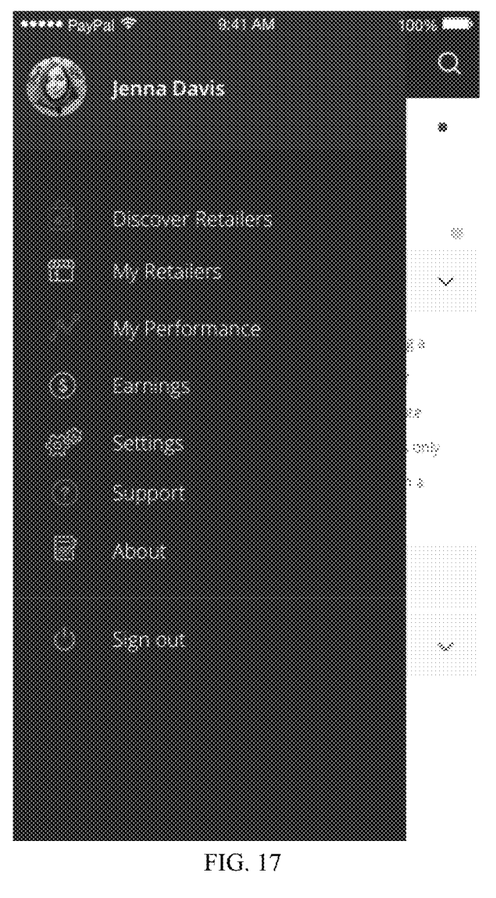

FIG. 17 illustrates a general menu ("Hamburger" menu) for setting preferences and viewing application information such as earned commissions.

Figure 18:
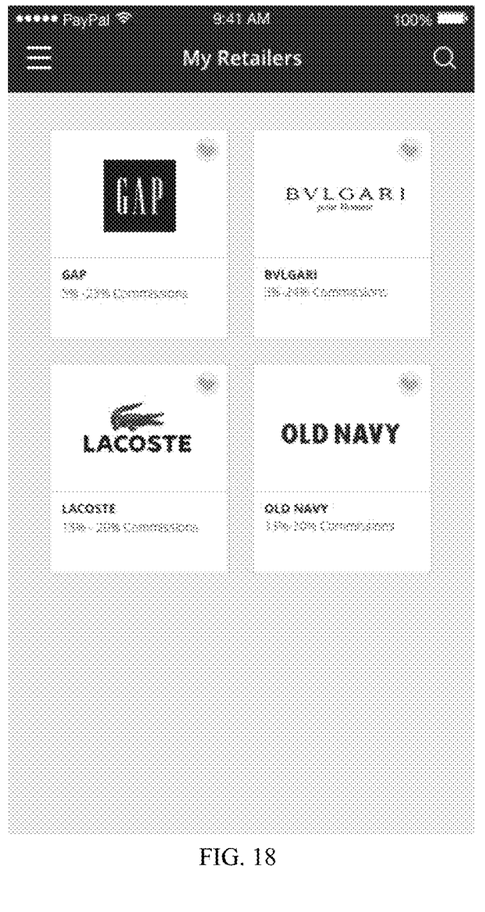

FIG. 18 illustrates retailers for which the user has enrolled in corresponding affiliate programs. The user may select a particular retailer and browse products.

Figure 19:
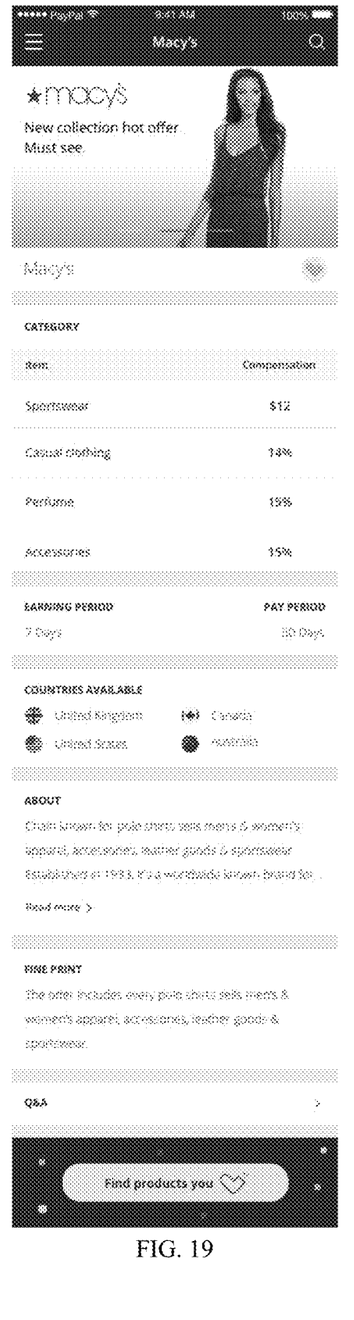

FIG. 19 shows an affiliate program detail screen.

Figure 20:
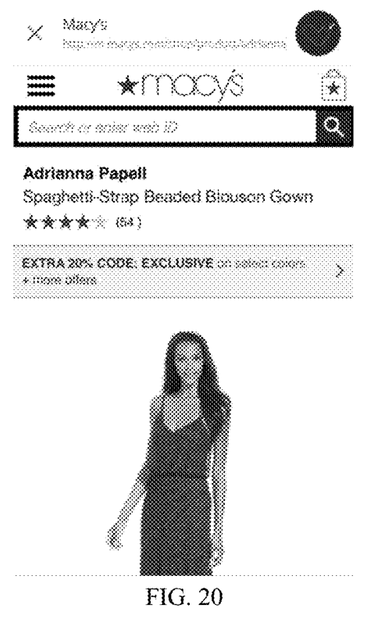

FIG. 20 shows a high-level product catalogue for a particular selected retailer.

Figure 21:
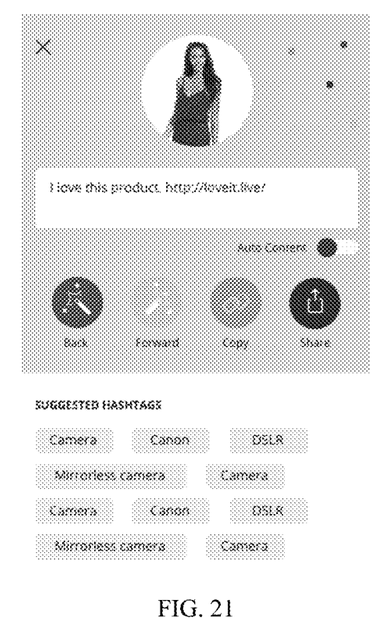

FIG. 21 shows a share screen with the user may interact to generate an affiliate link from a product detail screen by selecting a single-action user interface element (such as the "share" button).

Figure 22:
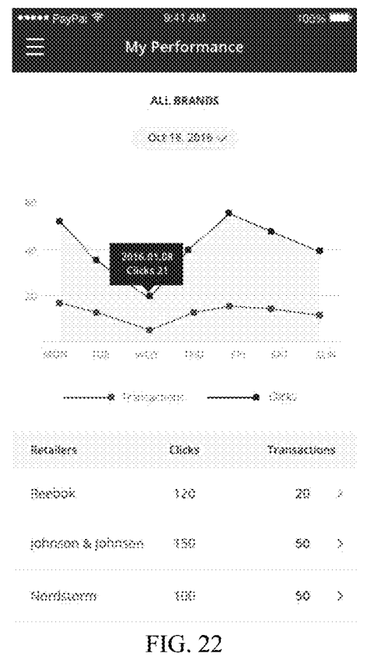
Figure 23:
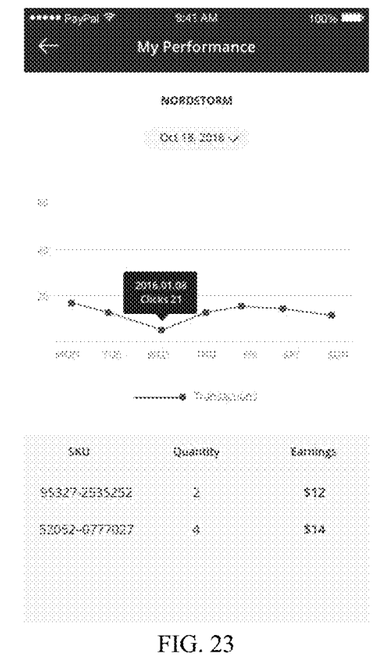

FIGS. 22-23 illustrate user interface screens for tracking performance of affiliate link sharing that the user has initiated, including number of clicks, date trending, and earned commissions.

Figure 24:
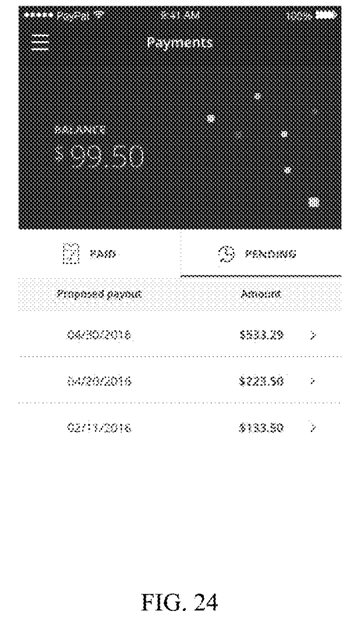
Figure 25:
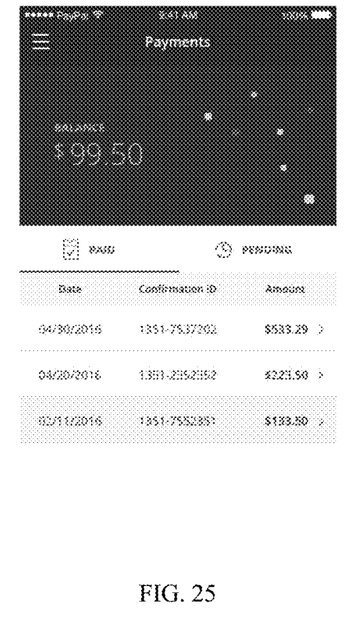
Figure 26:
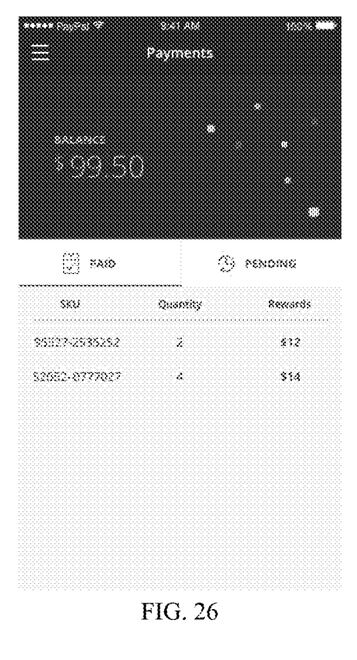

FIGS. 24-26 illustrate user interface screens for viewing earned commissions which may include paid commissions, pending commissions, product information that was purchased as well as quantities The following features may be included in systems and computer-implemented methods and are within the scope of the claimed invention:

User activity may be tracked to ensure that a particular user is not violating terms of use of affiliate programs; such information may be provided to affiliate program providers for blocking access to certain functionality or to suspend a user's account;

In some embodiments, shared affiliate links generated by embodiments of the invention may be moderated to ensure that shared links on banned websites (e.g. websites that violate affiliate program rules such as rules against sharing on pornographic websites) or banned users will not able to access the retailer page when interacting with the shared links. In some embodiments, it may be determined that a sharing user has violated affiliate program policies in which case the affiliate link will not be directed to the relevant purchase page. The affiliate link may be blocked by the invention and/or by the affiliate program itself by receiving information about banned users by the invention. In some embodiments, the affiliate link may be inaccessible if affiliate program rules have been changed or the item is no long available as part of the affiliate program. As mentioned elsewhere in this specification, the affiliate link generating system and methods may mask the generated affiliate link with a shortened or branded URL. The substitute URL may protect affiliate program providers when a generated affiliate link is shared to banned site/application or by a banned user since other users viewing the affiliate link may be aware of the affiliate program/retailer associated with the shortened/branded URL.

User activity may be archived and analyzed to offer incentive programs, discounts, virtual dollars such as "virtual" bucks, virtual gift cards, etc.

Transaction history may be archived and analytics performed thereon so that suggestions may be offered to sharing users about other affiliate programs and/or sharing options that will maximize the probability of purchases being made by other users viewing shared affiliate links;

The affiliate link generated may be customized depending on the receiver's buying habits, geography, user specific content such as Facebook profile, etc. When a user of the client system chooses to share a product with multiple individuals, the affiliate link may be customized for each individual.

The invention may provide functionality for optimizing how affiliate links are shared between users. For example, the server system may determine that the receiving user and the requesting user are in different countries and therefore the generated link should be customized according to the receiver's location. In some embodiments, the client device and/or server system may automatically determine how a link is to be shared (i.e. using specific applications) without the use having to manually select the sharing application.

In some embodiments, a purpose of the invention is to reduce the complexity of working with affiliate links by publishers/contributors, and, managing of affiliate links by merchants participating in affiliation programs. In some embodiments, the invention provides one or more of the following features:

Simpler way of generating product and category affiliate links from merchant pages.

Suggesting similar affiliation programs.

Moderating affiliate links by monitoring originating traffics.

Preventing publishers/contributors violation of affiliation program policy by allowing/disallowing publication to restricted channels.

Suggesting contents based on historical statistics, affiliation program policies, and, publication channels.

Finer details tracking of contributors and followers affiliate link usage.

Notifying publishers/contributors when the affiliate link's content is changed.

An example implementation of the present disclosure includes the following workflow:

An application (Mobile App) is installed on a mobile device #1 (client system).

A web server #2 hosts the database and server-side codes.

One or many client systems #3 view the message from mobile device #1.

There is a communication channel between the mobile device #1 and web server #2. It can be direct channel, web services, proxy servers, etc.

There is a communication channel between the client systems #1 and #3. It can be direct channel, web services, proxy servers, etc.

There is a communication channel between the web server #2 and client systems #3. It can be direct channel, web services, proxy servers, etc.

Other applications #7 on the mobile device listed in #1 can access the application by a system-wide button (Mobile App share button).

The application (Mobile App) appears when the button in other applications #7 is activated.

The application (Mobile App) accesses the available information of the other application in other applications #7. For example, a user activated the (Mobile App share) button from a web browser, the application accesses the url information. Another example, a user activated the (Mobile App share) button from a Facebook app, the application accesses the image or message.

The information collected as described above, with the originating application information, are sent to the web server #2

Web server receives the information that is sent as described above. It searches its database to find a match of an affiliation program #11. Matching criteria can be based on text contextual search, or, 2D/3D image search. Further details of the merchant information might be scraped from its website.

Similar affiliation programs #12 are searched by the information received as described above. Ranking is based on similarity ranking of all affiliation programs.

Other attributes of the affiliation programs #11 and #12 are retrieved from database. Example attributes of the affiliation programs can be allowable publication channels and content suggestions.

One or several unique URL links are created for the affiliation programs #11 and #12.

Information about the affiliation programs are transmitted back to mobile device #1.

The application (Mobile App) on mobile device #1 displays the matched and similar affiliation programs, and, user can select the desired affiliation program. Selection is optional when only matching one is displayed.

The application (Mobile App) user on mobile device #1 can share the unique affiliate link through the system-wide sharing function or copy and paste Suggested contents from information about the affiliation programs may be pre-filled depending on the publication channel user selected (Optional).

Warning message is displayed when user selected a forbidden publication channel (Optional).

Mobile device #1 sends usage information to web server #2. Usage information may include publication channel selection, and, message contents.

User on mobile device #1 published the contents to other client systems #3, through the publication channel selected for sharing, as described above.

Web server #2 receive the usage information sent from the mobile device #1. It commits the affiliate link that user has selected and record the usage statistics (missing merchant page content statistics).

Users of other client systems #3 receive the contents published by the mobile device #1 and activate the unique affiliate link. The client systems #3 make a request to web server #2.

Web server #2 receives the request from the client system #3. Web server searches the banned traffics database based on the originating traffic (optional).

If the originating traffic is found in the banned traffics database, web server #2 alerts the client systems #3 that the access is declined. Traffic is recorded for statistic collection (optional).

Web server #2 retrieves attributes of the merchant and the unique affiliate link (optional).

Web server #2, when attributes of the merchant and unique affiliate link are present, delivers the information to client systems #3 (optional).

Client systems #3 receives information delivered from web server #2, and display the information to users (optional).

Users from client systems #3 proceeds to request web server #2 about the merchant URL, when users perform some interaction with the information received at the client system #3, and/or, display time limit has reached.

Web server #2 retrieves the merchant and contributor information from its database based on the unique affiliate link. Traffic is recorded for statistic collection.

Web server #2, response to the client systems #3 the URL location of the merchant page.

Client systems #3 displays the merchant page.

Web server #2, on a schedule interval, periodically retrieves the merchant page of the affiliate link (Optional).

Merchant page statistics are collected. Statistics may be title, meta tags, last modified date, hash signature.

Merchant page statistics are compared to previous statistics. Notification is sent to contributor on mobile device #1 if the statistics are different.

Merchant page statistics are stored in database.

In some embodiments, a feature of the invention is the one-tap affiliate, unique link generation. It's typical form, in contributor's perspective, using web browser as an example. User browse to a merchant product page, clicks the Android/iOS share button, selects Mobile App, Mobile App generates the affiliate link, and, user selects the channel to share from the Android/iOS share menu. Included are other add on functionalities, which may be optional.

In some embodiments, variations may include:

Instead of using the system-wide sharing function of Android/iOS, the interface is built-in to the app.

Instead of generating a unique affiliate link to the merchant, use the merchant link and the affiliate ID.

Database can be any form of storage.

All usage statistic collections are optional.

Contributors may copy the URL from a web browser, append some unique key to identify a particular usage.

Contributors may install browser plugin to interface a web service page (e.g., https://chrome.google.com/webstore/detail/amazing-affiliate-link/ikoompcclgdajb-bijbhpgfpigolnbgpk)

User may install server side codes to automate affiliate generation (e.g., https://skimlinks.com/).

The invention claimed is:

1. A computer-implemented method for generating an affiliate link from an item selected on a computing application, the item and corresponding information originating from at least one merchant site that offers an affiliate program, the method comprising:
receiving from a server system a user identifier of a first client system;
persistently storing the user identifier at the first client system;
at the first client system, displaying item information identifying the item and displaying a selectable single action user interface element to generate an affiliate link related to the item information, wherein the selectable single action user interface element excludes input of any affiliate program information;
in response to selection of the single action user interface element at the first client system, sending to a server system a request to generate an affiliate link based on at least some of the item information and the user identifier;
at the server system, in response to the request to generate an affiliate link, determining a match between the item information and a respective affiliate program by referencing a database, the match being determined using matching criteria based on a text contextual search or an image search, the database containing user information, item information, and affiliate program information associated with respective item information;
at the server system, automatically generating the affiliate link based on the determined match; and
at the server system, automatically sending the generated affiliate link to the first client system;
wherein the method is performed in absence of any interaction between the first client system and the at least one merchant site, and in absence of any interaction between the server system and the at least one merchant site.

2. The method of claim 1, wherein the item is one of: a product, a service or a retailer.

3. The method of claim 1, further comprising:
at the first client system, sharing the generated affiliate link with at least a second client system.

4. The method of claim 3, wherein the generated affiliate link is shared over at least one computing application selected from the group consisting of: a social network application, an internet browser application, an email application, a text application, a messaging application, an affiliate aggregation application, and an e-commerce applications.

5. The method of claim 1, wherein the generated affiliate link is masked by a proprietary URL that is shorter than the generated affiliate link.

6. The method of claim 5, wherein, in response to selection of the masked URL by any client system, the server system redirects the computing system to an URL of the generated affiliate link.

7. The method of claim 4, further comprising:
in response to a purchase completed by the second client system interacting with the generated affiliate link, crediting an account associated with the user identifier with a commission.

8. The method of claim 7, wherein the commission credited to the account is determined by the server system by referencing the database to determine one or more rules for commissions associated with the respective affiliate program.

9. A non-transitory computer readable medium for generating an affiliate link from an item selected on a first client system, the item and corresponding information originating from at least one merchant site that offers an affiliate program, the computer readable medium comprising instructions executable by a server system to:
transmit, to the first client system, a user identifier;
wherein the first client system is caused to:
persistently store the user identifier; and
display item information identifying the item and displaying a selectable single action user interface element to generate an affiliate link related to the item information, wherein the selectable single action user interface element excludes input of any affiliate program information;
in response to selection of the single action user interface element at the first client system, receive, from the first client system, a request to generate an affiliate link, the request including item information and the user identifier;
in response to the request, determine a match between the item information and a respective affiliate program by accessing a database, the match being determined using matching criteria based on a text contextual search or an image search, the database containing user information, item information, and affiliate program information associated with respective item information;
generate an affiliate link based on the determined match; and
communicate the generated affiliate link to the first client system;
wherein the server system is caused to access the database and generate the affiliate link in absence of any interaction with the at least one merchant site.

10. The non-transitory computer readable medium of claim 9, wherein the generated affiliate link includes information for tracking a purchase completed by a second client system interacting with the generated affiliate link.

11. The non-transitory computer readable medium of claim 9, wherein the generated affiliate link is masked by a branded URL which is referenced to the generated affiliate link.

12. The non-transitory computer readable medium of claim 11, wherein the instructions further cause the server system to:
in response to receiving a selection of the masked URL by a second client system, redirect the second client system to the generated affiliate link.

13. The non-transitory computer readable medium of claim 11, wherein the instructions further cause the server system to:
in response to a purchase completed by a second client system interacting with the generated affiliate link, credit an account associated with the user identifier with a commission;
wherein the account is not enrolled in the respective affiliate program.

14. A system for generating an affiliate link for an item offered by at least one merchant site that has an affiliate program, the system comprising:
a first client system executing a client application;
a server system executing a server application; and
a database in communication with the server system, the database storing containing user information, item information, and affiliate program information associated with respective item information;
the client application, when executed, causing the first client system to:
provide a user interface element for selecting the item for which to generate the affiliate link;
in response to selection of the user interface element, send a request to the server system to generate the affiliate link, the request including item information related to the item and a user identifier;
wherein the first client system provides the user interface element and sends the request in absence of any interaction with the at least one merchant site;
the server application, when executed, causing the server system to:
in response to the request to generate the affiliate link, determine a match between the item information and a respective affiliate program by accessing the database, the match being determined using matching criteria based on a text contextual search or an image search;
generate the affiliate link based on the determined match; and
send the generated affiliate link to the first client system;
wherein the server system accesses the database and generates the affiliate link in absence of any interaction with the at least one merchant site.

15. The system of claim 14, wherein the client application, when executed, further causes the first client system to:
provide a sharing component for communicating the generated affiliate link to a second client system.

16. The system of claim 15, wherein the client application is also executable by the second client system.

17. The system of claim 15, wherein the client application, when executed, further causes the first client system to:
provide a dashboard for viewing commissions earned due to purchases completed by the second client system interacting with the generated affiliate link.

18. The system of claim 14, wherein the server application, when executed, further causes the server system to:
whether the first client system or the user identifier is associated with violation of one or more rules defined by the respective affiliate program; and
send the generated affiliate link to the first client system only after determining that there is no violation.

* * * * *